United States Patent [19]

De Moss et al.

[11] E Re. 30,974

[45] Reissued Jun. 15, 1982

[54] PRODUCTION OF TELEVISION SIGNALS FROM PHOTOGRAPHIC DISC RECORDINGS

[75] Inventors: Dean L. De Moss, Glendale, Calif.; David P. Gregg, Los Angeles, Calif.; Wayne R. Johnson, deceased, late of Los Angeles, Calif., by Minnesota Mining and Manufacturing Company, Saint Paul, Minn.

[73] Assignee: Minnesota Mining and Manufacturing Company, Saint Paul, Minn.

[21] Appl. No.: 39,286

[22] Filed: May 15, 1979

Related U.S. Patent Documents

Reissue of:

[64] Patent No.: 3,381,086
Issued: Apr. 30, 1968
Appl. No.: 217,408
Filed: Aug. 16, 1962

U.S. Applications:

[63] Continuation-in-part of Ser. No. 181,392, Mar. 21, 1962, abandoned.

[51] Int. Cl.[3] ..... G11B 7/02; G11B 25/04

[52] U.S. Cl. ..... 369/44; 346/137; 352/103; 358/128.5; 358/128.6; 358/132; 358/216; 369/100; 369/101; 369/106; 369/111; 369/112

[58] Field of Search ..... 179/100.1 G, 100.3 B, 179/100.3 D, 100.3 M, 100.3 V; 346/137; 352/24, 26, 102, 103; 358/130, 132, 216, 128.5, 128.6; 360/71, 73, 135; 369/44, 100, 101, 106, 111, 112

[56] References Cited

U.S. PATENT DOCUMENTS

| | | | |
|---|---|---|---|
| 594,094 | 11/1897 | Nelson | 352/103 |
| 1,864,519 | 6/1932 | Boularan et al. | 352/26 |
| 1,877,447 | 9/1932 | Friebus | 179/100.3 B |
| 1,967,882 | 7/1934 | Hammond | 179/100.3 V |
| 1,978,183 | 10/1934 | Alexanderson | 179/100.3 |
| 2,121,211 | 6/1938 | Padva | 179/100.3 D |
| 2,422,398 | 6/1947 | Dilks | 179/100.3 V |
| 2,656,419 | 10/1953 | Dingley | 360/71 |
| 2,838,683 | 6/1958 | Munro | 250/227 |
| 2,890,277 | 6/1959 | Duke | 358/216 |
| 2,972,660 | 2/1961 | Toulon | 179/100.3 B |
| 3,138,669 | 6/1964 | Rabinow | 179/100.4 R |
| 3,171,106 | 2/1965 | Lemmond | 360/56 |
| 3,234,326 | 2/1966 | Goldmark | 358/132 |

FOREIGN PATENT DOCUMENTS

| | | |
|---|---|---|
| 540721 | of 0000 | Belgium . |
| 493234 | 5/1953 | Canada . |
| 624265 | 7/1961 | Canada . |
| 663124 | 7/1938 | Fed. Rep. of Germany . |
| 702967 | 2/1941 | Fed. Rep. of Germany . |
| 1334717 | 7/1963 | France . |
| 1401545 | 4/1965 | France . |
| 299459 | 8/1965 | Netherlands . |
| 6515514 | 5/1967 | Netherlands . |
| 6604784 | 10/1967 | Netherlands . |
| 445068 | 4/1936 | United Kingdom . |
| 714365 | 8/1954 | United Kingdom . |
| 987357 | 3/1965 | United Kingdom . |

OTHER PUBLICATIONS

Electronics, vol. 24, Jul. 1951, pp. 114–116, "Continuous Film Scanner for TV."

RCA Review, vol. 24, Sep. 1963, pp. 406–420, "Discussion and Applications of Electrostatic Signal Recording."

*Primary Examiner*—Howard Britton

*Attorney, Agent, or Firm*—Cruzan Alexander; Donald M. Sell; William B. Barte

EXEMPLARY CLAIM

6. In combination in a system for reproducing *video* information from a rotatable medium where the medium has characteristics at progressive positions along a spiral path for modifying energy directed at the medium in representation of *video* information previously recorded on the medium where the information recorded on the medium at each successive position along the spiral path represents substantially less than a complete visual image, means operatively coupled to the medium for producing a continuous rotation of the medium, pickup means disposed relative to the medium including, means for directing [energy] *a beam of energy having a radius not greater than approximately one*

*micron to enable the reproduction of the video information* at the medium at each instant to obtain a modification of the energy passing from the medium at that instant in accordance with the variations in the characteristics of the medium at the progressive positions along the spiral path, and means responsive to the modified energy at each instant for producing signals having characteristics representative at that instant of the information recorded at the progressive positions along the spiral path on the medium, [and]

means operatively coupled to the pickup means for varying in synchronism at each instant the position of the means for directing energy and the means responsive to the modified energy in a direction having a radial component to obtain a *coarse* tracking at each instant of the characteristics at the progressive positions along the spiral path on the medium, *and means for varying in synchronism at each instant the position of the signal producing means relative to the energy directing means to obtain a fine tracking along the spiral path on the medium.*

13 Claims, 6 Drawing Figures

10
200
202
204
206
208
208a
208b
209
210
212
214
216
218
220
222
X-Y Drive
Time
Tracking
402
404
406
440
300
302
304
306
308
310
312
316
318
320
321
322
323
324
326
360
D.C. Video Amplifier
X-Y Driver
B+
Adder
Diff. Amplifier
Tracking Motor
Control Tube
Oscillator
Gate
Pulse Former
Video Output
Sync

PRODUCTION OF TELEVISION SIGNALS FROM PHOTOGRAPHIC DISC RECORDINGS

Matter enclosed in heavy brackets [ ] appears in the original patent but forms no part of this reissue specification; matter printed in italics indicates the additions made by reissue.

[This is a continuation-in-part] *The original Pat. No. 3,381,086, upon which this reissue application is based, issued Apr. 30, 1968, upon application Ser. No. 217,408, filed Aug. 16, 1962, which was a continuation-in-part* of *then* copending application Ser. No. 181,392 filed Mar. 21, 1962, by Wayne R. Johnson for Transducing System, and now abandoned.

*FIELD OF THE INVENTION*

This invention relates to a system for recording information such as video and audio information on a storage medium, such as a disc or tape, and for reproducing such information from the storage medium.

*BACKGROUND TO THE INVENTION*

Systems have been devised in recent years for recording high frequency information on a storage medium and for attaining a subsequent reproduction of the information from the storage medium. For example, information has been recorded on a magnetic tape where the information constitutes video and audio signals having characteristics which respectively represent at each instant an image being viewed and the sounds emanating from the environment of the image. Signals are also recorded on storage media in representation of different scientific and mathematical information, including the readings of instruments and the values obtained from computations performed by digital computers.

For the recording of high frequency information, the systems now in use generally employ magnetic tapes as the storage medium. These tapes have, in general, proved fairly satisfactory in recording signals representative of information and in obtaining the reproduction of the information. However, the fidelity of the recording and reproduction is dependent upon the magnetic structure of the tape so that the magnetic tapes have to be manufactured with considerable precision. However, the information recorded on the magnetic tapes has a limited density of information packing so that a relatively great amount of tape is required to store the information represented, for example, by a television program having a duration of approximately a half hour. The limited density of information packing on the tape has resulted from limitations in the speed of response of the magnetic transducer heads which are disposed in contiguous relationship to the tape. It has also resulted from limitations in the frequency at which information can be transferred between the magnetic transducer heads and the magnetic layers on the tape.

The systems now in use generally dispose the transducing head adjacent to the tape to record information in magnetic form on the tape and to reproduce such magnetic information as electrical signals from the tape. The adjacent relationship between the transducing head and the tape causes the tape to rub occasionally against the head so that magnetic particles become removed from the tape and are deposited on the head to affect the operation of the head. The magnetic particles removed from the tape also tend to produce an abrasive action on the head so that the response characteristics of the head become permanently affected.

It is difficult to use a magnetic tape as a master for the reproduction of a large quantity of identical tapes because of the wear on the tape and the adjacent heads and because of the considerable length of the tape required for the master.

Systems using discs as the master would probably be more desirable than tapes since they tend to store information in a more compact form than tapes. However, the disc systems of the prior art have generally involved a groove cut in a disc of plastic material, with variations in the walls of the groove representing the electrical information.

The disc systems of the prior art have had certain important deficiencies. For example, the reproducing means has generally been in contiguous relationship with the disc. Actually, the reproducing means has constituted a needle which has contacted the groove in the disc to reproduce the information on the disc. This contact between the needle and the groove has tended to wear the disc after some copies have been made.

*SUMMARY OF THE INVENTION*

This invention provides a system using a storage medium such as a disc which is responsive to information to be recorded so as to vary the light transmission characteristics of the disc in accordance with such information. For example, the light transmission characteristics of the disc are varied in a spiral track during the recording operation by an electron beam whose characteristics are controlled by signals representative of the incoming information. By way of illustration, the intensity of the electron beam may be varied by adjusting the potential on the grid of an electron gun in accordance with the characteristics of the information to be recorded. Since the electron beam is projected toward the disc from a position removed from the disc, no frictional forces are produced on the disc by the transducing action.

The signals are reproduced from the disc by directing at the disc a light beam and by modifying the light beam in accordance with the light transmission characteristics previously provided at successive positions on the spiral track in the disc. The modified light beam is detected to obtain a recovery of the information previously recorded on the disc. By directing a light beam at the disc, the information on the disc can be reproduced without having any members directly engage the disc. In this way, no wear is produced on the disc during the reproduction of the information on the disc.

In addition to the inventive features discussed above, the system constituting this invention also includes means for controlling the tracking of the reproducing means across the disc as information is received from the disc. A coarse control is provided for following the spiral track on the disc as the information is reproduced from the disc. A fine control is provided to center the reproducing means relative to the track as the information is reproduced from the disc.

Another important feature of the system constituting this invention results from the inclusion of electrical circuitry for insuring that the information is reproduced from the disc at substantially the same rate as the information is recorded on the disc. This eliminates problems which have resulted from variations in the speed of the disc during the reproduction of information from the disc relative to the speed of movement of the disc during the recording of information on the disc. Such relative variations in the speed of movement of the disc have been designated as "flutter" and "wow." These relative variations in the speed of movement of the disc have occurred for a number of reasons including instantaneous variations in the operation of the motor driving the disc.

In addition to the inventive features in the system as described above, the disc used in conjunction with the system is also novel. In one embodiment, the disc is provided with a backing made from a suitable material to have characteristics of transmitting light. A thin coating of photographic emulsion is placed on the backing. The photographic emulsion is sensitive to electrical energy so as to become exposed when subjected to an electron beam. The degree of exposure at each instant depends on the intensity of the electron beam at that instant. Because of this, the disc contains at progressive positions on the spiral track light transmission characteristics which represent the variable intensity of the electron beam.

The information is retrieved from the disc by directing a light beam through the disc. Since the disc has variable characteristics of transmitting light at successive positions on the disc, the intensity of the light beam passing through the disc at each instant is varied in accordance with the light transmission characteristics of the disc.

It will be appreciated that the disc may be provided with variable characteristics of reflecting light rather than transmitting light. Under such circumstances, the reproducing means is operative upon the light reflected from the disc rather than the light transmitted through the disc. It will also be appreciated that other information storage means such as a cylinder or even a tape may be used instead of the disc without departing from the scope of the invention.

*DETAILED DESCRIPTION*

Figure 1:
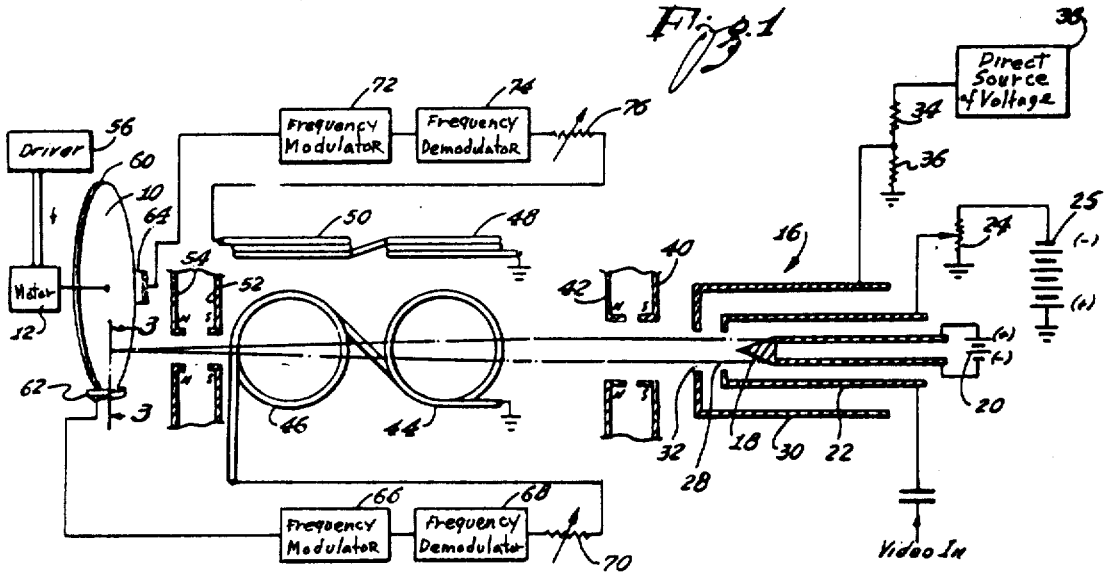
FIG. 1 is a circuit diagram, partly in block form, of a system for obtaining a recording of information on a disc and of apparatus for driving the disc.

In the recording system of FIG. 1, a disc 10 is driven by a motor 12 to rotate at a substantially constant speed. The disc is subjected to a beam of charged particles 14 as it rotates. This beam 14 of charged particles is obtained from an accelerating gun such as an electron gun generally indicated at 16. The electron gun 16 includes a filament 18 which is constructed from a suitable material to emit charged particles such as electrons when current flows through the filament. The current may be provided by a suitable source of direct voltage such as a battery 20. The filament 18 is shaped to direct the electrons in a beam toward the disc 10 as the disc rotates. For example, the filament is provided with a pair of walls which converge in a direction toward the disc 10.

The electron gun 16 also includes a grid 22 which is disposed between the filament 18 and the disc 10 at a position adjacent to the filament. The grid 22 is adjustably biased by connecting the grid to the movable arm of a high impedance potentiometer 24 and by connecting the potentiometer 24 in series with a suitable source of voltage such as a battery 26. One terminal of the potentiometer 24 and the positive terminal of the battery 26 may be connected to a suitable reference potential such as ground. The grid 22 is provided with an aperture 28 at a position adjacent to the converging end of the filament 18 to provide for a shaping of the beam 14 of charged particles.

The electron gun also includes an anode 30 which is provided with an aperture 32 to further shape the beam 14 of electrons. The anode 30 is connected to a voltage-dividing network including a pair of resistors 34 and 36 to receive a positive voltage of relatively great magnitude from a source 38 of direct voltage. For example, the voltage applied to the anode 30 may be in the order of +10,000 volts.

In addition to the focusing action on the beam of electrons by the aperture 28 in the grid 22 and the aperture 32 in the anode 30 further focusing actions may be produced as by magnetic lenses 40 and 42. Each of the lenses 40 and 42 may constitute a permanent magnet which is shaped as a hollow annular ring. The axis of the magnets 40 and 42 corresponds to the center of each of the apertures 28 and 32.

With respect to the track to be recorded on the disc 10, a first direction of the electron beam 14 is controlled by a pair of coils 44 and 46. A second direction of the electron beam 14 perpendicular to the first is controlled by a pair of coils 48 and 50.

A final focusing action of the beam 14 is produced by magnetic lenses 52 and 54. Each of the lenses 52 and 54 may constitute a permanent magnet which is shaped as a hollow annular ring. The axis of the magnets 52 and 54 corresponds to the center of each of the apertures 28 and 32 and to the axis at the lenses 40 and 42.

As the disc 10 rotates it is driven in a radial direction by the driver 56. The driver may be a lead screw or a rack and pinion arrangement so as to impart the radial motion to the motor 12. The motor 12 is connected to the disc 10 and any motion of the motor 12 is transmitted to the disc 10. The combination of the rotation of the disc 10 plus the radial motion produces a spiral track on the disc 10.

The intensity of the beam 14 is controlled by varying the potential on the grid 22 of the electron gun in accordance with the variations in the signal representing the information to be recorded on the disc 10. The video information is introduced to the grid 22 of the electron gun 16 through a coupling capacitor 58.

Figure 2:
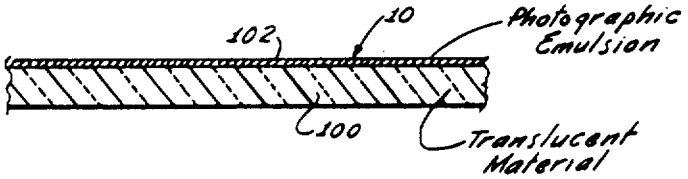
FIG. 2 is an enlarged sectional view of the storage medium such as the disc illustrated in FIG. 1.

The beam 14 impinges on the disc 10 to change the surface characteristics of the disc. As illustrated in FIG. 2, the disc 10 has a backing member 100 which usually consists of a translucent plastic material. Deposited on the backing member 100 is a photographic emulsion 102. This emulsion is sensitive to energy from the electron beam 14 so as to become exposed where the electron beam hits the emulsion. The amount of exposure of the photographic emulsion 102 at each instant is dependent upon the intensity of the beam 14 at that instant.

FIG. 1 also includes circuitry for obtaining instantaneous corrections in eccentricity or off-center rotation of the disc 10. The disc 10 is provided with an outer coating of metal 60 around its peripheral edge. The coating of metal 60 serves as a common plate for two capacitors. The other plates are provided by elements 62 and 64 which are angularly displaced from each other by 90 degrees around the periphery of the disc 10.

As the disc rotates any eccentricities in the rotation varies the capacitance of the capacitor formed by the plate 62 and the coating 60 and the capacitor formed by the plate 64 and the coating 60. The capacitance formed between the plate 62 and the coating 60 is included in a frequency modulator 66 to control the modulator by varying the frequency of the output signal of the frequency modulator 66 in accordance with variations in the value of the capacitance. Since the value of the capacitance varies at a frequency related to the speed at which the disc 10 is rotated, the signals produced by the modulator 66 are modulated at a frequency corresponding to the speed of the rotation of the disc 10.

The frequency modulator 66 is connected to a frequency demodulator 68 to demodulate the frequency modulated signal. This causes the control signal from the frequency demodulator 68 to have an instantaneous amplitude in accordance with any eccentricities in the disc 10 and at each instant of time along the radial line extending from the center of the disc 10 to the plate 62 and to have a frequency related to the speed of rotation of the disc 10. The control signal from the frequency demodulator 68 is, therefore, in synchronism with the rotation of the disc 10.

The control signal passes through an adjustable attenuator 70 which is initially adjusted to provide a proper positioning of the beam and to compensate for any fixed errors which may be present in the system and the control signal is applied to the deflection coils 44 and 46. The signal supplied from the attenuator 70 to the coils 44 and 46 provides indication of any eccentricity in the rotation of the disc 10 in the radial direction of the disc 10. The coils 44 and 46 shift the beam on an instantaneous basis in the radial direction to compensate for any eccentricity in the rotation of the disc 10 along the radial line so that the beam is recorded on the disc 10 in a spiral path.

The disc 10 is also corrected for eccentricity in rotation in a direction substantially perpendicular to the radial line upon which the beam 14 is directed. This is accomplished by placing the plate 64 substantially 90 degrees from the plate 62 so that the value of the capacitance between the plate 64 and the coating 60 varies with eccentricity in rotation of the disc in the direction from the center of the disc 10 to the plate 64. Since the capacitance between the plate 64 and the coating 60 is included within a frequency modulator 72, variations in the value of the capacitance produce corresponding variations in the frequency of a signal from the modulator 72. The signal is demodulated by a frequency demodulator 74 to produce a control signal in accordance with the magnitude of the eccentricity. The frequency demodulator 74 operates in a manner similar to that described above for the demodulator 68.

The control signal from the demodulator 74 is applied to an adjustable attenuator 76. The adjustable attenuator 76 operates in a similar manner to the adjustable attenuator 70. The signal then passes to the deflection coils 48 and 50 which are at right angles to the deflection coils 44 and 46 to provide an instantaneous correction in the position of the beam 14 as it strikes the disc 10. This direction is along the spiral track on the disc 10. By instantaneously varying the position at which the beam is directed to the spiral track, the information becomes recorded at a substantially constant rate on the track in the spite of any eccentricities in the rotation of the disc 10.

It will be appreciated that other methods of determining eccentricity in the rotation of the disc 10 may be used. For example, magnetic means may be used to determine off-center rotation. Also, the field for deflecting the electron beam 14 is illustrated as being produced by magnetic coils. However, it will be appreciated that the field may be produced by other means without departing from the scope of the invention. For example, the deflected field may be produced by capacitive plates which provide electrostatic action.

Figure 3:
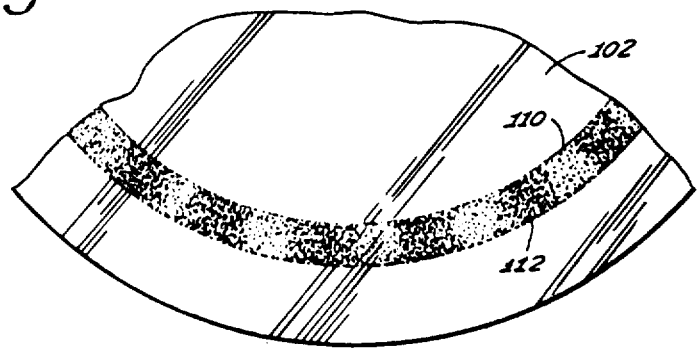
FIG. 3 is an enlarged fragmentary sectional view schematically illustrating the characteristics of the signals recorded on the disc.

FIG. 3 shows a fragmentary view of a portion of the surface pattern on the disc 10 to represent information which is recorded on the disc. The beam is focused to strike the disc in an area of approximately 1 micron radius, and the intensity of the beam determines whether the exposed area is light or dark. FIG. 3 shows variable density gradations in the exposure of the photographic emulsion 102. In the areas where the beam 14 has a relatively high intensity, the photographic emulsion 102 has an optimul exposure and the track is transparent to light, as indicated at 110 in FIG. 3. In other areas where the beam has a relatively low intensity, the exposure is slight and the track is relatively dark, as indicated at 112 in FIG. 3.

As the information on the disc is reproduced, the light areas pass a relatively great amount of light in the beam 14 directed toward the disc, and the dark areas pass a relatively small amount of light in the beam. This causes the light beam to be modulated such that a light signal representative of the information on the disc is produced. It will be appreciated that the disc 10 is only illustrative of the information member which may be used. For example, cylinders and tapes may also be used.

Figures 4, 5, 6:
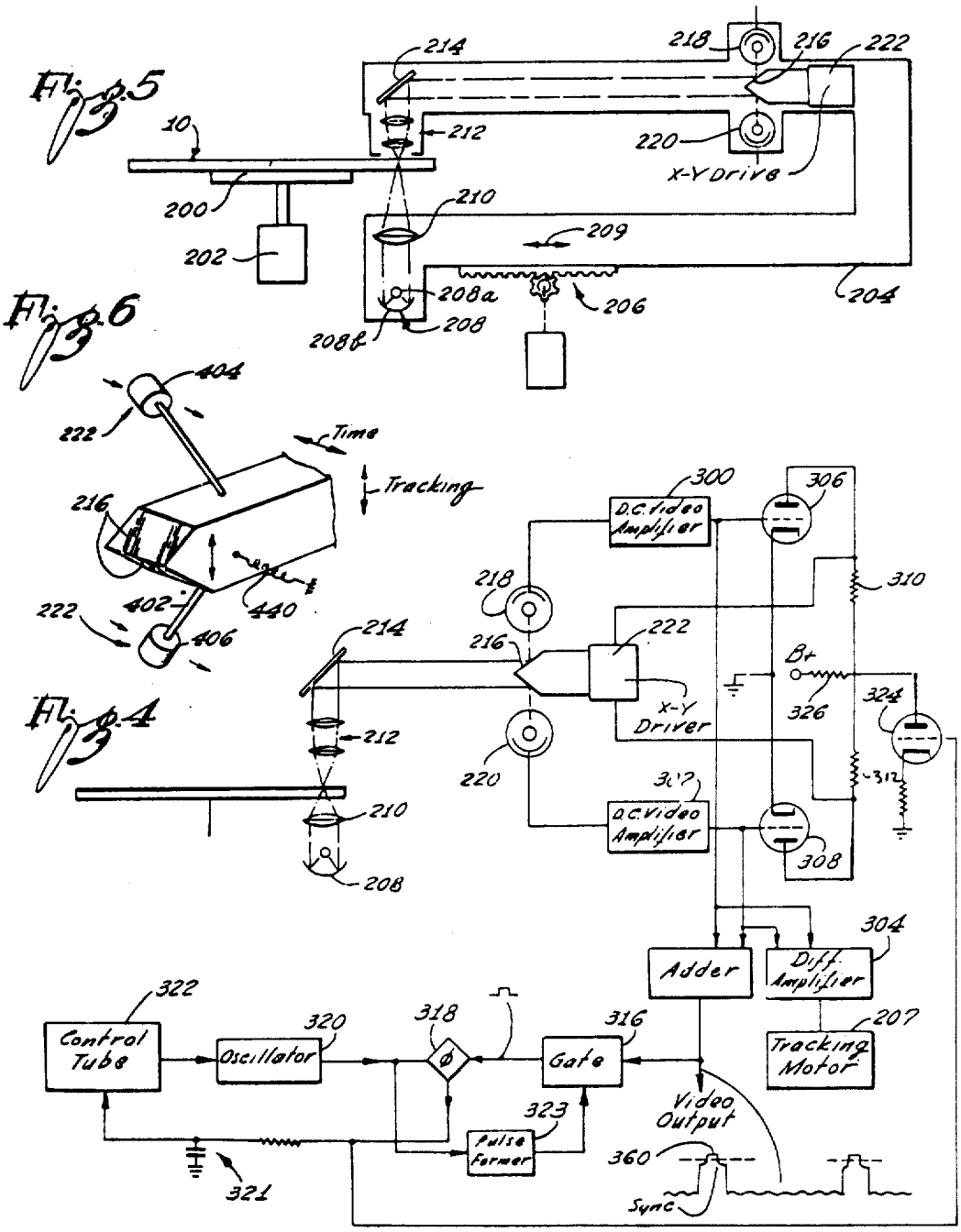
FIG. 4 is a circuit diagram, partly in block form, of a system for obtaining a reproduction of the information previously recorded on the storage medium, including a schematic representation of the apparatus for controlling the tracking of the reproducing means.
FIG. 5 is a somewhat schematic elevational view of the mechanical details in the reproducing means to show how the reproducing means is disposed relative to the disc to obtain a reproduction of the information on the disc.
FIG. 6 is a somewhat schematic fragmentary perspective view further illustrating the apparatus for controlling the tracking of the reproducing means.

FIG. 5 shows a schematic elevational view of the mechanical structure used in obtaining a reproduction of information on the disc. The disc 10 is positioned on a turntable 200 which is driven by a motor 202 to rotate at a substantially constant speed. A U-shaped member 20 is used as a pickup arm to house the reproducing equipment. The U-shaped member is driven by a rack-and-pinion arrangement 206 in a direction substantially parallel to the flat face of the disc, as indicated by arrows 209 in FIG. 5. The motion of the arrangement is provided by a motor 207. It will be appreciated that other means such as a lead screw arrangement may be used to drive the U-shaped member 204. This motion is provided to obtain the reproduction of the information on the spiral track on the disc.

Also mounted on the U-shaped member 204 is a source of light 208. The source 208 includes a light bulb 208a and a reflecting member 208b to direct a beam of light through a lens 210. The lens 210 focuses the light from the light source to a radius of approximately 1 micron at the surface of the disc 10. The beam of light passes through the disc 10 at each position with an intensity dependent upon the characteristics of the information recorded on the disc 10 at that position. The modulated beam of light then passes through a lens system 212 which enlarges the beam of light to a radius of approximately 100 microns.

The modulated light beam is reflected by a polished mirror 214 which directs the beam of light to a mirror 216 having two sides disposed at an acute angle relative to the beam and having a total height in FIG. 4 of approximately 100 microns and having a width of approximately 100 microns. The modulated light beam is reflected from the mirror 216 in two directions to impinge on photocells 218 and 220. The photocells give an electrical indication of the information on the disc 10. The signals received from the photocell 218 and from the photocell 220 are compared to control the operation of a driver 222. The driver 222 determines the position of the mirror 216[and]. *This comparison* also controls the movement of the rack-and-pinion 206 to provide a tracking of the information on the disc 10.

FIG. 4 shows in block form the electrical stages for controlling the tracking of the information on the disc 10. The reproducing apparatus is the same as that shown in FIG. 5 and has the same reference numerals. The signals from the photocells 218 and 220 pass respectively through DC video amplifiers 300 and 302. The signals from the DC video amplifiers 300 and 302 are applied to a differential amplifier 304 which produces an output signal having an amplitude in accordance with any difference in the amplitude of the signals from the photocells 218 and 220.

The amplitude of the signals applied to the differential amplifier 304 is dependent upon the position of the mirror 216. If the mirror 216 should be reflecting equal portions of the beam of light to the photocells 218 and 220, it would be positioned in the center of the beam. Under such circumstances, there would be no output from the differential amplifier 304 to indicate that the reproducing means would have to be adjusted in position relative to the spiral groove on the disc 10. However, since the track on the disc 10 is spiral, the radial position of the track is constantly varying as the disc rotates. This causes an output signal to be constantly produced by the differential amplifier 304. This signal is applied to the tracking motor 207 which controls the movements of the rack-and-pinion arrangement 206. The arrangement 206 accordingly moves the reproducing means, including the light source 208, the lenses 210 and 212 and the mirror 214, in a direction substantially parallel to the flat surface of the disc 10. The reproducing means are moved by the arrangement 206 in a direction for reducing the amplitude of the output signal from the differential amplifier 304. Since the tracking motor 207 has a relatively slow operation, it provides a coarse control over the tracking of the information on the disc 10. This corresponds to the progressive decrease in the radius of the track on the disc 10 because of the spiral configuration of the track.

As a means of fine control over the tracking of the information on the disc 10, the two signals from the DC video amplifiers 300 and 302 are applied respectively to tubes 306 and 308. These tubes respectively receive plate potentials through resistors 310 and 312 from a source of voltage shown as B+. The output potentials on the plates of the tubes are applied to the driver 222, which controls the movement of the mirror 216. This is illustrated in FIG. 6.

The driver 222 includes a pair of mechanical linkages 400 and 402 coupled to the mirror 216 and respectively coupled to control members 404 and 406. The control members 404 and 406 receive signals from the plates of the tubes 306 and 308 illustrated in FIG. 5. The mechanical linkages 400 and 402 are connected to the mirror 216 with an acute angle between the mechanical linkages and the beam of light passing from the mirror 214 to the mirror 216. The mechanical linkages [404 and 406] *400 and 402,* also extend in a direction substantially parallel to the planar surface of the disc 10 and substantially perpendicular to the direction indicated by the arrows 209. The control members can be any form of electrical means which produce a mechanical movement upon the introduction of an electrical signal. For example, the control members can be electrostatic, electromagnetic, ceramic or any other suitable means. The signals from the plates of the tubes 306 and 308 produce a movement of the mechanical members 400 and 402 to move the mirror 216.

When the signals introduced to the control members 404 and 406 are equal in amplitude, the components of the signals produced in the direction indicated as "tracking" in FIG. 6 cancel such that no force is produced on the mirror 216 in the "tracking" direction. However, when the signals introduced to the control members 404 and 406 are unequal in amplitude, the resultant forces produced on the mirror 216 by the members 404 and 406 in the direction indicated as "tracking" is unequal. This causes the mirror 216 to be moved in the direction indicated as "tracking" in FIG. 6, and the amount of light received by each half of the mirror 216 in FIGS. 5 and 6 to become adjusted. In this way, an equal amount of light does become received by each half of the mirror and the beam [14] becomes centered relative to the spiral track on the disc 10 as the disc rotates. The centering of the beam is accomplished by a fine control provided by the members 404 and 406.

The signal introduced to the control members 404 and 406 also causes a force to be produced on the mirror 216 in a direction indicated as "time" in FIG. 6. This corresponds to an annular direction along the flat surface of the disc 10 and further corresponds to a direction perpendicular to the direction indicated as "tracking" and perpendicular to the direction of movement of the rack in the arrangement 206. The force is produced on the mirror 216 in the "time" direction by the addition of the forces produced in the control members 404 and 406 in this direction and by the cancellation of the forces produced in the "tracking" direction. The force produced in the "time" direction is used to insure that the information in the spiral track on the disc [206] is reproduced at a substantially constant rate regardless of any instantaneous deviations in the speed of the motor 202.

The circuitry for controlling the production of the force on the mirror [206] *216* in the "time" direction is illustrated in FIG. 4. The circuitry includes an adder 314 which receives the two signals from the DC video amplifiers 300 and 302 and which produces an output signal representing the sum of the two input signals. Because of this, the output signal from the adder 314 effectively represents the average of the two signals introduced to the adder. Since the output signal from the adder is used as the video signal in providing a recovery of the information recorded on the disc, averaging the two input signals is advantageous in minimizing errors.

The video signal produced by the adder 314 is also applied to a gate 316, the operation of which is controlled by a pulse former 323. The signal passing through the gate 316 is introduced to a phase detector 318 which also receives signals from an oscillator 320. The oscillator 320 operates generally at the same frequency as the repetition rate of the sync pulse in the video signal from the adder 314. The output from the phase detector 318 is applied to an integrating circuit 321 having a relatively long time constant. The output from the circuit 321 varies the bias on a control tube 322. The control tube 322 controls the precise frequency of operation of the oscillator 320. The pulse former 323 also receives signals from the oscillator 320 to produce pulses at the same frequency as the signals from the oscillator 320. The pulses from the pulse former 323 are applied to the gate 316 to provide a gating operation.

The entire video signal is applied to the gate 316. The gate 316 is biased against the passage of signals having amplitudes below a particular level such as the dotted line 362 shown in the video signal. Because of this bias, the gate can only pass the sync pulse 360 and can pass this pulse only upon the application of a gating pulse from the pulse former 323. The sync pulse passing through the gate 316 is then applied to the phase detector 318, which also receives sine waves from the oscillator 320.

The output from the phase detector 318 has an amplitude representative of the difference in phase from a particular relationship between the sync pulse from the gate 316 and the sine wave from the oscillator 320. The output from the phase detector 318 has a polarity which is representative of the direction of the difference in phase from the particular relationship of the sync pulse from the gate 316 and the sine wave from the oscillator 320. The signal from the phase detector 318 passes through the integrating circuit 321 to control the bias applied by the circuit 321 to the control tube 322. Because of the long time constant of the integrating circuit 321, the control bias applied to the control tube 322 can change only slowly. This causes the frequency of the oscillator 320 to change slowly and to maintain at the average repetition rate of the sync pulse 316 from the adder 314.

The signal from the phase detector 318 is also applied as an error signal to the grid of a tube 324, the plate of which receives the B+ voltage through a resistor 326. The magnitude of the current flowing through the tube 324 is dependent upon the amplitude of the error signal applied at the grid of the tube. The magnitude of the current flowing through the tube 324 controls the supply voltages for the tubes 306 and 308 since the three resistors 310, 312 and 326 are all connected at a common point. This has the effect, therefore, of varying equally the amplitudes of the signals introduced to the control members 404 and 406 in the XY driver 222.

Referring again to FIG. 6, the variations produced by the tube 324 in the amplitude of the signals introduced to the control members 404 and 406 affect only the position of the mirror 216 in the "time" direction and not in the "tracking" direction. The reason is that the variations in the signals cancel in the "tracking" direction. By varying the position of the mirror 216 in the "time" direction corresponding to the direction of the spiral track on the disc, errors resulting from deviations in the speed of the motor 202 are compensated. This results from the fact that variations in the speed of the motor 202 cause corresponding variations in the rate of production of the information in the spiral track on the disc. The variations in the position of the mirror 216 in the "time" direction also affect the rate at which the information in the spiral track on the disc 10 is being reproduced on an instantaneous basis. The variations in the disposition of the mirror 216 in the "time" direction affect the [date] *rate* of reproduction since the width of the mirror in the "time" direction is less than the width of the spot size being reflected by the mirror 214 toward the mirror 216.

It will be appreciated that the mirror 216 may be spring biased in the "time" direction by a member 440 to impose a constant intermediate force on the mirror. When the composite force exerted on the mirror 216 in the "time" direction by the control members 404 and 406 is less than that exerted by the spring 440, the mirror 216 is moved in one of the two opposite "tracking" directions. The mirror 216 is moved in the other of the two opposite "tracking" directions when the composite force exerted on the mirror by the control members 404 and 406 exceeds the force exerted by the spring 440.

It will be apparent to those skilled in the art that the disc in the system described above may be provided with reflective characteristics rather than light transmissive characteristics. Under such circumstances, the backing member 100 of the disc 10 may have reflective characteristics, and the source 208 of light and the pickup means including the mirrors 214 and 216 may both be located on the same side of the disc 10.

It will also be appreciated that other media than the disc 10 may also be used without departing from the scope of the invention. For example, the medium may constitute a cylinder with the track extending in a spiral direction around the annular periphery of the cylinder and along the axis of the cylinder. It will also be appreciated that the information recorded on the medium may be other than visual. For example, digital information and information representing variable outputs of instruments may also be recorded on the medium.

Although this application has been disclosed and illustrated with reference to particular applications, the principles involved are susceptible of numerous other applications which will be apparent to persons skilled in the art. The invention is, therefore, to be limited only as indicated by the appended claims.

What is claimed is:

[1. In combination for use with a medium having at successive positions variable characteristics representing information recorded on the medium of visual images to obtain the reproduction of such information where the variable characteristics of the medium control the amount of light passing from the medium upon the direction of light toward the medium and where the information recorded on the medium at each successive position represents substantially less than a complete visual image, means for providing a continuous movement of the medium to present the successive positions on the medium for the reproduction of the recorded information, means disposed on one side of the medium for continuously directing a beam of energy toward the medium at each instant of time to obtain variations in the intensity of the energy at the instant passing from the medium at one of the successive positions in accordance with the characteristics of the medium at that one of the successive positions, means responsive to the variations in intensity of the beam of energy passing at each instant from the medium at one of the successive positions for converting such energy into signals having characteristics corresponding to the intensity of such energy at that instant, and means responsive to the energy passing from the medium at each instant for controlling the rate of presenting at that instant the successive positions on the medium for the passage of the energy at that instant to the converting means to obtain an accurate reproduction of the information on the medium.]

[2. The combination set forth in claim 1 wherein the energy is in the form of light and wherein the converting means include photoelectric means for producing electrical signals from the beam of light and wherein the medium is in the form of a thin film and wherein the means for producing a movement of the medium rotates the medium.]

[3. In combination for use with a medium having at successive positions on a track variable characteristics representing information recorded on the medium of visual images to obtain the reproduction of such information wherein the variable characteristics of the medium at the successive positions control the intensity of energy passing from the medium upon the direction of energy toward the medium and wherein the medium is in the form of a thin film and wherein the means for producing a movement of the medium rotates the medium, first means for producing a continuous rotation of the medium, second means disposed relative to the medium for directing energy toward the medium at each instant to obtain variations in the energy passing from the medium at each instant in accordance with the variations in the characteristics of the medium at one of the successive positions along the track at that instant, third means responsive to the energy passing at each instant from the track at the successive positions for producing signals in accordance with the variations in the energy passing from the track at that one of the successive positions along the track at that instant, the third means being variably positioned relative to the medium at each instant in a direction having a radial component for obtaining the response of the third means only to the light at the successive positions on the track, and fourth means responsive at each instant to the signals produced by the third means for varying at that instant the position of the third means relative to the medium in the direction having the radial component for obtaining the response of the third means only to the light at the successive positions on the track.]

[4. In combination for use with a medium having at successive positions on a track variable characteristics representing information recorded on the medium of visual images to obtain the reproduction of such information wherein the variable characteristics of the medium control the intensity of energy passing from the medium upon the direction of energy toward the medium and where the information recorded on the medium at each successive position represents substantially less than a complete visual image, first means for producing a movement of the medium along the track of information recorded on the medium, second means disposed relative to the medium for directing energy at the medium to obtain a modification of intensity of the energy passing from the medium in accordance with the variations in the characteristics of the medium at successive positions along the track of the medium, third means responsive to the modified energy passing from the medium for dividing the modified energy into two component portions each having an intensity in accordance with the modification of the energy by the medium at successive positions along the track of the medium, means responsive to the energy in at least one of the component portions for converting such energy to the information previously recorded on the medium, and means responsive to the two component portions of the modified energy for positioning the third means relative to the medium in a direction transverse to the presentation of the successive positions on the track in accordance with any difference in intensity between the two component portions of the modified energy to obtain the energy beam passing from the track in a particular disposition relative to the third means.]

[5. In combination for use with a medium having at successive positions on a track variable characteristics representing information recorded on the medium of visual images to obtain the reproduction of such information wherein the variable characteristics of the medium control the intensity of energy passing from the medium upon the direction of energy toward the medium and wherein the medium is in the form of a thin film and wherein the means for producing a movement of the medium rotates the medium, means operatively coupled to the medium for rotating the medium, means disposed relative to the medium for directing energy at the medium, means disposed relative to the medium for detecting the energy passing from the successive positions in the track on the medium, reproducing means operatively coupled to the detecting means for dividing the detected energy into two component portions having relative intensities representative of the positioning of the detecting means relative to the track on the medium, the detecting means being variably positioned relative to the medium to obtain a tracking by the detecting means of the track on the medium, means responsive to any difference in intensity between the two component portions of the detected energy for varying the position of the detecting means relative to the medium to minimize such differences in intensity between the two component portions, and means responsive to the detected energy for converting such energy into the information previously recorded on the medium.]

6. In combination in a system for reproducing *video* information from a rotatable medium where the medium has characteristics at progressive positions along a spiral path for modifying energy directed at the medium in representation of *video* information previously recorded on the medium where the information recorded on the medium at each successive position along the spiral path represents substantially less than a complete visual image, means operatively coupled to the medium for producing a continuous rotation of the medium, pickup means disposed relative to the medium including, means for directing [energy] *a beam of energy having a radius not greater than approximately one micron to enable the reproduction of the video information* at the medium at each instant to obtain a modification of the energy passing from the medium at that instant in accordance with the variations in the characteristics of the medium at the progressive positions along the spiral path, and means responsive to the modified energy at each instant for producing signals having characteristics representative at that instant of the information recorded at the progressive positions along the spiral path on the medium, [and]

means operatively coupled to the pickup means for varying in synchronism at each instant the position of the means for directing energy and the means responsive to the modified energy in a direction having a radial component to obtain a *coarse* tracking at each instant of the characteristics at the progressive positions along the spiral path on the medium, *and means for varying in synchronism at each instant the position of the signal producing means relative to the energy directing means to obtain a fine tracking along the spiral path on the medium.*

[7. In combination in a system for reproducing information from a rotatable medium where the medium has characteristics along a spiral path for modifying energy directed at the medium in representation of information previously recorded on the medium where the information recorded on the medium at each successive position along the spiral path represents substantially less than a complete visual image, first means operatively coupled to the medium for producing a rotation of the medium, second means disposed relative to the medium for directing energy at the medium to obtain a modification of the energy passing from the medium in accordance with the variations in the characteristics along the spiral path on the medium, third means responsive to the modified energy passing from the medium for producing a pair of signals each having a magnitude in accordance with the modification of the energy by the medium and in accordance with the disposition of the third means relative to the spiral path on the medium, the third means being movable relative to the medium in a direction having a radial component for obtaining a tracking by the third means of the information in the spiral path on the medium, means responsive to any differences between the two component portions of the modified energy for positioning the third means relative to the medium in the direction having the radial component in accordance with any such difference to obtain a tracking by the third means of the spiral path on the medium, and means responsive to at least one of the signals in the pair for reproducing the information previously recorded in the spiral path on the medium.]

[8. In combination for use with a rotatable member and having information recorded on the member in a spiral track where the information recorded on the medium at each successive position along the spiral path represents substantially less than a complete visual image, a system for reproducing the information in the spiral track as the member rotates, including, first means operatively coupled to the annular member for producing a rotation of the member, second means disposed in spaced relationship to the annular member for producing first and second signals having characteristics representative of the information in the spiral track on the member during the rotation of the member, the second means being movable relative to the medium in a direction having a radial component to obtain a tracking by the second means of the information in the spiral track on the annular member, differential means responsive to the first and second signals for comparing the characteristics of the signals to produce a control signal in accordance with any difference between such characteristics, driving means responsive to the control signal from the differential means for varying the position of the second means in the direction having the radial component to minimize the control signal and to obtain a tracking by the second means of the spiral track on the member, and means responsive to at least one of the first and second signals for obtaining a reproduction of the information in the spiral track on the member.]

9. The combination set forth in claim [8] *6*, including, means responsive to [at least one of the first and second signals] *the modified energy at each instant* for varying the [position of the second] *disposition of the signal producing means relative to the beam directing* means in the [annular] *rotatable* direction along the spiral track to obtain a reproduction of information from the track at a rate corresponding to the recording of the information on the track.

[10. In combination for use with an annular member rotatable in the annular direction and having information recorded on the member at progressive positions in a spiral track in the annular direction, a system for reproducing the information in the spiral track as the annular member rotates, including, means disposed relative to the annular member for directing energy at the member, means disposed in displaced relationship to the annular member for receiving the energy passing from the member at the progressive positions in the spiral track on the member, means operatively coupled to the receiving means for producing information in accordance with the characteristics of the energy received by the receiving means, first means operatively coupled to the annular member for driving the member in the annular direction relative to the receiving means, second means operatively coupled to the receiving means for driving the reproducing means in a second direction transverse to the annular direction and defining the spiral track with the annular direction, third means responsive to the received energy and disposed relative to the receiving means for producing first and second signals each having characteristics representing the received energy at each instant, means operatively coupled to the second means and responsive to any differences in the characteristics of the first and second signals for controlling the operation of the second means to obtain movements of the receiving means in a direction for reducing any such differences and for obtaining a tracking by the receiving means of the spiral track on the annular member, and means operatively coupled to the third means and responsive to at least one of the first and second signals for varying the positioning of the third means in a third direction transverse to the second direction and the annular direction and along the spiral track in accordance with the characteristics of such signals to obtain the reproduction of the information in the spiral track at a rate related to the recording of the information in the spiral track.]

[11. The system set forth in claim 10, including, means responsive to at least one of the first and second signals and operatively coupled to the third means for varying the position of the third means in a direction for reducing any differences in the characteristics of the first and second signals.]

12. The combination set forth in claim [7] *6* wherein the [second means] *means for directing a beam of energy* are disposed relative to the medium for directing light energy at the medium and wherein [the third means] *said means responsive to said modified energy* are responsive to the modified light energy passing from the medium.

[13. The combination set forth in claim 4 wherein the second means are disposed relative to the medium for directing light energy at the medium and wherein the third means are responsive to the light energy passing from the medium.]

[14. The combination set forth in claim 3 wherein the medium is in the form of a thin disc.]

15. In combination in a system for reproducing *video* information from a rotatable medium where the medium has characteristics along a spiral path in the direction of rotation for modifying energy directed at the medium in representation of *video* information previously recorded on the medium where the information recorded on the medium at each successive position along the spiral path represents substantially less than a complete visual image, means operatively coupled to the medium for continuously producing a rotation of the medium, means disposed relative to the medium for directing [energy] *a beam of energy having a radius not greater than approximately one micron* at the medium at each instant to obtain a modification of the energy passing from the medium at that instant in accordance with the variations in the characteristics of the medium along the spiral path[,] *corresponding to the recorded video information,* means responsive to the modified energy at each instant for producing signals having characteristics representative of the *video* information recorded at the successive positions in the spiral path on the medium, and means responsive to the signals produced by the last-mentioned means at each instant for varying the position of the energy-responsive means *relative to the energy directing means* at that instant in a direction having a radial component to obtain a *fine* tracking [by the energy-responsive means] of the characteristics at successive positions in the spiral path on the medium.

16. In combination for use with a medium having at successive positions variable characteristics representing *video* information recorded on the medium of visual images to obtain the reproduction of such *video* information wherein the variable characteristics of the medium control the amount of energy passing from the medium upon the passage of energy from the medium and wherein the information recorded on the medium at each successive position represents substantially less than a complete visual image, first means for providing a continuous movement of the medium to present the successive positions on the medium for the reproduction of the recorded information, second means disposed on one side of the medium for continuously directing a beam of energy *having a radius of not greater than approximately one micron* toward the medium at each instant to obtain variations in the intensity of the energy passing from the medium at that instant at one of the successive positions in accordance with the characteristics of the medium at that one of the successive positions[,] *corresponding to the recorded video information,* third means responsive to the energy passing from the medium at each instant at one of the successive positions on the medium for producing information in accordance with the characteristics of such energy, fourth means for providing for variations in the position of at least one of the second and third means in a direction corresponding to the direction of the movement of the medium, and fifth means operatively coupled to the third means and to the fourth means for obtaining at each instant variations in the positions of at least one of the second and third means by the fourth means in the direction corresponding to the direction of movement of the medium in accordance with the pattern of the information produced at each instant by the third means[.] *to obtain a substantially constant rate of reproduction.*

17. The combination set forth in claim 16 wherein the information is recorded in a spiral path on the medium and wherein the medium is rotated by the first means and wherein means are provided for obtaining movements of the medium relative to the second and third means in a direction having a radial component to obtain the reproduction of the information in the spiral path on the medium.

18. In combination for use with a medium having at successive positions along a track variable characteristics representing information recorded on the medium of visual images to obtain the reproduction of such information wherein the variable characteristics of the medium at the successive positions along the track control the amount of energy passing from the medium upon the direction of energy toward the medium and wherein the information recorded on the medium at each successive position represents substantially less than a complete visual image, first means for providing a movement of the medium in a first direction corresponding to the successive positions along the track on the medium, second means disposed relative to the medium for continuously directing a beam of energy at each instant toward the track on the medium to obtain a continuous passage of energy from the medium at that instant at one of the successive positions along the track in accordance with the characteristics of the medium at these successive positions, third means disposed relative to the medium for receiving at each instant the energy passing from the medium at one of the successive positions along the track on the medium and for producing at that instant electrical signals having characteristics in accordance with the intensity of the energy at that one of the such successive positions, fourth means operatively coupled to the second and third means for producing at that instant a variable force on at least one of the second and third means to vary the position at each instant of at least that one of the second and third means along the track in accordance with variations in this force, fifth means operatively coupled to the third and fourth means and responsive at each instant to the pattern of the electrical signals produced by the third means for obtaining variations at that instant in the force provided by the fourth means on at least that one of the second and third means, and sixth means operatively coupled to the third means for continuously producing information at each instant in accordance with the characteristics of the electrical signals at that instant.

19. The combination set forth in claim 18 wherein the successive positions along the track define a spiral and wherein means are provided for producing a movement of the medium relative to the second and third means in a direction along the medium but transverse to the successive positions along the track to obtain the reproduction of the information at the successive positions along the spiral track.

[20. In combination for use with a medium having at successive positions along a spiral track variable characteristics representing information recorded on the medium to obtain the reproduction of such information wherein the variable characteristics of the medium at the successive positions along the track control the amount of energy passing from the medium upon the direction of energy toward the medium, first means for providing a movement of the medium in a first direction corresponding to the successive positions along the track on the medium, second means disposed relative to the medium for continuously directing a beam of energy toward the medium at each instant to obtain a passage of energy from the medium at that instant at one of the successive positions along the track in accordance with the characteristics of the medium at that one of the successive positions, third means disposed relative to the medium for continuously receiving the energy passing from the medium at each instant at one of the successive positions along the track on the medium and for producing at that instant electrical signals having characteristics in accordance with the intensity of the energy at that one of such successive positions, fourth means operatively coupled to the second and third means for obtaining a movement of the second and third means in a second direction transverse to the successive positions along the track but substantially parallel to the medium to provide a spiral scan of the medium by the second and third means, fifth means operatively coupled to the fourth means and to the third means and responsive to the pattern of the electrical signals produced at each instant by the third means for obtaining variations in the rate of movement of the second and third means in the second direction at that instant in accordance with the pattern of such signals to obtain a tracking by the second and third means of the successive positions along the spiral track of the medium, and sixth means operatively coupled to the third means for producing information in accordance with the characteristics of the electrical signals.]

[21. The combination set forth in claim 20 wherein the third means are variably positioned in a third direction transverse to the medium to provide adjustments in the position at which energy is received by the third means from the medium and wherein means are operatively coupled to the third means and are responsive to the electrical signals produced by the third means for varying the position of the third means in the third direction in accordance with the characteristics of the electrical signals to maintain the third means centered on the spiral track.]

[22. In combination for use with a medium having at successive positions along a spiral track variable characteristics representing information recorded on the medium to obtain the reproduction of such information wherein the variable characteristics of the medium at the successive positions along the track control the amount of energy passing from the medium upon the direction of energy toward the medium, first means for providing a movement of the medium in a first direction corresponding to the successive positions along the track on the medium, second means disposed relative to the medium for directing a beam of energy toward the medium to obtain a passage of energy from the medium at the successive positions along the spiral track in accordance with the characteristics of the medium at these successive positions, third means disposed relative to the medium for continuously receiving at each instant the energy passing from the medium at the successive positions along the spiral track on the medium and for continuously producing at that instant first and second electrical signals each having characteristics at that instant in accordance with the intensity of the energy passing from the medium at such successive positions along the spiral track and each having at that instant an intensity relative to that of the other signal dependent upon the position of the third means relative to the spiral track in a second direction transverse to the successive positions on the track but substantially parallel to the medium, fourth means operatively coupled to the third means for producing at each instant information in accordance with the characteristics of at least one of the first and second electrical signals at that instant, fifth means operatively coupled to the third means and responsive to the first and second electrical signals for producing a control signal at each instant in accordance with the difference in the intensity of the first and second electrical signals at that instant of time, sixth means operatively coupled to the second and third means for producing a movement of the second and third means in the second direction, and seventh means operatively coupled to the fifth and sixth means for varying the rate of movement of the second and third means by the fifth means at each instant in accordance with the characteristics of the control signal produced by the sixth means at that instant.]

[23. The combination set forth in claim 22, including, eighth means operatively coupled to the third means for obtaining a variable displacement of the third means in a third direction transverse to the medium and transverse to the successive positions along the spiral track on the medium for varying the relative characteristics of the first and second electrical signals, and ninth means operatively coupled to the eighth means and to the third means for obtaining variations in the displacement of the third means by the eighth means in the third direction in accordance with the relative characteristics of the first and second electrical signals to provide substantially equal characteristics for the first and second electrical signals.]

24. The combination set forth in claim 19 wherein the second means are constructed to continuously direct the beam of energy toward the track on the medium in a controlled direction to obtain the continuous reproduction of information from the track on the medium at each instant.

*25. The combination set forth in claim 6, including,*

*means operatively coupled to the pickup means for varying in synchronism at each instant the position of the directed energy relative to the means responsive to the modified energy in the direction of the spiral track to obtain the production of the signals at a controlled rate.*

*26. The combination set forth in claim 15, including,*

*means responsive to the produced signals at each instant for varying the disposition of the energy responsive means relative to the beam directing means at that instant in the spiral direction to obtain the production of the information signals at a controlled rate.*

*27. The combination set forth in claim 19 wherein*

*the fifth means are responsive to the signals produced by the third means at each instant for obtaining variations in the transverse direction at that instant in the force provided by the fourth means on at least that one of the second and third means.*

*28. The combination set forth in claim 19 wherein*

*the fifth means are responsive to the signals produced by the third means at each instant for obtaining variations in the spiral direction at that instant in the force provided by the fourth means on at least that one of the second and third means.*

* * * * *